(12) United States Patent
Strandberg

(10) Patent No.: US 6,754,236 B1
(45) Date of Patent: Jun. 22, 2004

(54) SYSTEM AND METHOD FOR DIALING IN A TELEPHONY SYSTEM USING A COMMON CHANNEL SIGNALING PROTOCOL IN WHICH THE USE OF BEARER CHANNELS IS MAXIMIZED

(75) Inventor: Malcom B. Strandberg, Cambridge, MA (US)

(73) Assignee: Concerto Software, Inc., Westford, MA (US)

( * ) Notice: Subject to any disclaimer, the term of this patent is extended or adjusted under 35 U.S.C. 154(b) by 811 days.

(21) Appl. No.: 09/677,990

(22) Filed: Oct. 3, 2000

(51) Int. Cl.[7] .................................................. H04J 3/12
(52) U.S. Cl. .................... 370/524; 370/537; 379/93.01; 379/133; 379/265.1; 379/266.08
(58) Field of Search ................................ 370/524, 537, 370/420, 433, 431, 522, 437, 468, 477, 493, 465, 494, 495, 498, 538; 379/355.01, 90.01, 93.01, 111, 112.01, 112.03, 112.05, 112.06, 112.07, 112.08, 112.1, 309, 133, 265.1, 265.02, 265.11, 266.01, 266.08, 266.1, 258

(56) References Cited

U.S. PATENT DOCUMENTS

| | | | |
|---|---|---|---|
| 5,155,763 A | * 10/1992 | Bigus et al. | ................ 379/111 |
| 5,295,184 A | 3/1994 | Smith et al. | |
| 5,420,867 A | 5/1995 | Price et al. | |
| 5,796,791 A | * 8/1998 | Polcyn | .................. 379/265.09 |
| 6,282,284 B1 | * 8/2001 | Dezonno et al. | ........ 379/265.09 |
| 6,411,708 B1 | * 6/2002 | Khan | ..................... 379/266.07 |
| 6,466,664 B1 | * 10/2002 | Zhao | ..................... 379/266.08 |
| 6,621,899 B2 | * 9/2003 | Dezonno et al. | ........ 379/265.09 |

* cited by examiner

Primary Examiner—William Luther
(74) Attorney, Agent, or Firm—Bourque & Associates, P.A.

(57) ABSTRACT

The system and method for dialing in a telephony system using a common channel signaling protocol, such as ISDN, maximizes the use of bearer or voice channels. The telephony system includes a dialing switch connected to a central office switch that supports the common channel signaling protocol. In one example, the connection is made using an ISDN primary rate interface (PRI) connection providing 23 bearer channels and one data channel. The dialing switch automatically dials to establish telephone connections between calling parties, such as agents in a call center, and called parties, such as existing or potential customers. The system also includes a telephony system control/manager that controls the dialing and manages telephony resources. The system determines predictive dialing factors, such as an anticipated connect ratio (ACR) of dialed numbers to connections with called parties, average talk time, a number of idle agents, and hold time. Based upon these predictive dialing factors, the system determines a number of telephone numbers to be dialed, which can exceed the number of bearer channels. Dialing commands are then transmitted over the data channel to dial the numbers, and the answered calls are connected over the available bearer channels to the calling parties. Predictive dialing is thus achieved with a number of bearer channels equal to the number of calling parties.

27 Claims, 2 Drawing Sheets

US 6,754,236 B1

SYSTEM AND METHOD FOR DIALING IN A TELEPHONY SYSTEM USING A COMMON CHANNEL SIGNALING PROTOCOL IN WHICH THE USE OF BEARER CHANNELS IS MAXIMIZED

FIELD OF THE INVENTION

The present invention relates to telephony systems that use a common channel signaling protocol and more particularly, to a system and method for predictive dialing in a telephony system using Integrated Digital Services Network (ISDN) protocol.

BACKGROUND OF THE INVENTION

Integrated Services Digital Network (ISDN) is a set of digital transmission protocols defined by CCITT (the Consultative Committee for International Telephone and Telegraphy). ISDN allows data (typically digitized voice signals) to be transmitted simultaneously across the world using end to end digital connectivity, with signaling carried separately from voice/data. In the analog network used by the Plain Old Telephone System (POTS), a two wire loop from the telephone company's local central office to the customer premises supports a single transmission channel for carrying only one service, such as voice, data or video, at a time. With ISDN, the same pair of twisted copper wires is logically divided into multiple channels.

ISDN defines two types of logical channels, distinguished by function and capacity. Bearer channels (or B channels) carry voice or data occupying a band width of 64 Kbps (or a multiple of 64 Kbps). A data channel (or D channel) handles signaling. Currently, there are two common types of ISDN services: basic rate interface (BRI) and primary rate interface (PRI). BRI consists of two 64 Kbps B channels and one 16 Kbps D channel for a total of 144 Kbps. PRI is intended for users with greater capacity requirements and includes 23 B channels plus one 64 Kbps D channel for a total of 1,536 Kbps, typically provided over a T1 line. Other combinations can also be used such as PRI-E1 or T3.

Fractional T1 spans are also available, for example, providing 15 channels including 14 B channels and 1 D channel. Also, multiple T1's can be configured to share a single D channel. Three T1 spans, for example, could provide 71 B channels plus 1 D channel, centralizing all signaling. Digital transmission of voice or data can also be implemented with an in-channel signaling method called robbed bit signaling. Using this method, voice is digitized and the least significant bit is used to pass signaling information.

Because of the increased data capacity of ISDN and the ability of ISDN to handle all types of information including voice and data, many types of telephony systems have begun to use ISDN. In particular, ISDN is useful in a telephone call center where voice and data communications must be established with a number of agents or operators in the call center. A typical call center is used for telemarketing or collections and automates the outbound dialing and connection of called parties (e.g. customers or potential customers) to the agents in the call center.

Most call centers use predictive dialing or call pacing techniques in which the number of outbound calls being placed exceeds the number of available agents, to maximize the use of the agents by ensuring that all available agents have a call to answer. In a conventional call center, a ratio of telephone (or trunk) lines to agents is established; for example, a ratio of 2:1 provides two trunk lines for every one agent. The ratio can be adjusted using call pacing algorithms to maximize the use of. agents while also ensuring that answered calls are not placed on hold for an extensive period of time. One example of a call pacing algorithm is disclosed in greater detail in U.S. Pat. No. 5,295,184 entitled DYNAMICALLY ADJUSTABLE CALL PACING SYSTEM, assigned to the assignee of the present invention and incorporated herein by reference.

When the conventional predictive dialing techniques are used with ISDN, the use of the bearer channels is not maximized because of the way in which calls are made using ISDN. A telephone call is typically made using ISDN by allocating a B channel in advance, sending the telephone number on the D channel, and waiting to see if the other party is available. If a connection is not made, the line is dropped and the allocated B channel can eventually be allocated to another call. Allocating a bearer channel in advance for each telephone number dialed results in wasted ISDN resources. If a number is dialed, for example, and no connection is made to the called party, the bearer channel allocated to that number is not utilized unti re-allocated to a number where a connection is made. Many existing ISDN specs actually prohibit the allocation of bearer channels in advance.

Accordingly, a need exists for a method of maximizing the use of bearer channels when using ISDN, ATM or another common channel signaling protocols for predictive dialing in a telephony system. A need also exists for a telephony system in which the cost of the number of ISDN lines required to support the telephony system or call center is reduced.

SUMMARY OF THE INVENTION

The present invention features a method for dialing in a telephony system using a common channel signaling protocol having at least one data channel for carrying data signals and a plurality of bearer channels for carrying voice signals. The method comprises determining predictive dialing factors and determining the number of telephone numbers to be dialed according to the predictive dialing factors and a predictive dialing algorithm. The number of telephone numbers to be dialed exceeds the number of bearer channels. Dialing commands are then transmitted over the data channel for the number of telephone numbers to be dialed independently of the number of bearer channels.

According to one embodiment, the common channel signaling protocol is an integrated services digital network (ISDN) protocol. The ISDN protocol includes a primary rate interface connection having one (1) data channel a twenty-three (23) bearer channels. In another embodiment, the common channel signaling protocol is an asynchronous transfer mode (ATM) protocol.

According to one method, the steps of determining the number of telephone numbers to be dialed and transmitting the dialing commands are performed continuously in a call pacing mode. The step of determining the predictive dialing factors can also be performed continuously to dynamically update the predictive dialing factors. According to another method, the steps of determining the number of telephone numbers to be dialed and transmitting the dialing commands are performed at least once in a burst dialing mode. The method can also include the step of tracking call statistics such that the predictive dialing factors are determined from the statistics. The predictive dialing factors include an anticipated connect ratio, an average talk time, an agent pool size, a number of idle agents, a number of calls on hold, and an average hold time.

The present invention also features a telephony system for predictive dialing using the common channel signaling protocol. The telephony system comprises a telephony control/manager for determining the predictive dialing factors and for determining a number of telephone numbers to be dialed according to the predictive dialing factors. The telephony system also comprises a dialing switch, connected to the control/manager and to the data channel and the bearer channels, for transmitting dialing commands for the number of telephone calls to be dialed over the data channel to a central office switch and for switching answered calls to available bearer channels.

DESCRIPTION OF THE DRAWINGS

The present invention will be better understood by reading the following detailed description, taken together with the drawings wherein.

DETAILED DESCRIPTION OF THE PREFERRED EMBODIMENT

Figure 1:
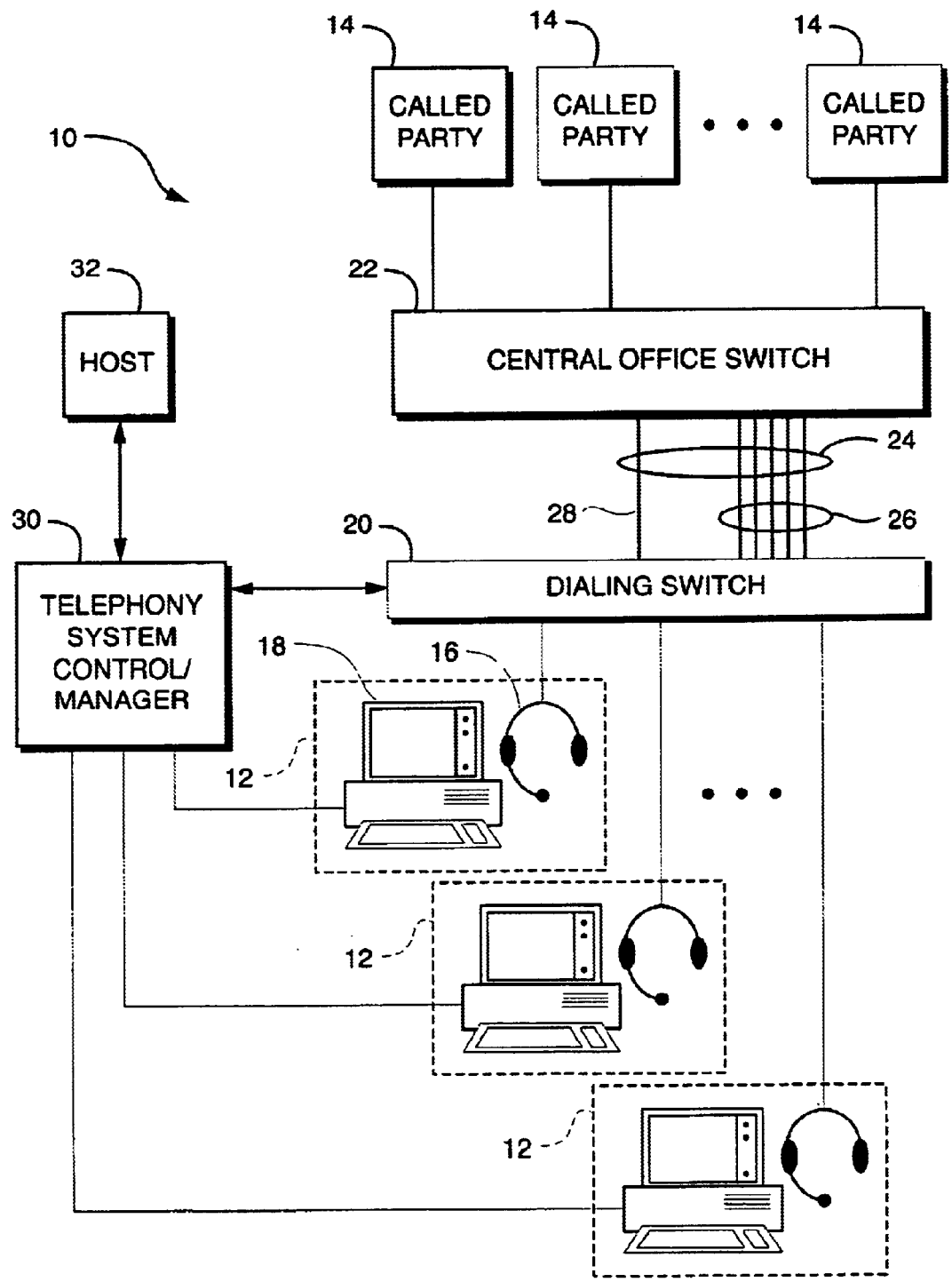
FIG. 1 is a schematic block diagram of the telephony system, according to the present invention.

The telephony system 10, FIG. 1, according to the present invention, is used to place multiple outbound telephone calls on behalf of a number of calling parties 12 to a number of called parties 14 using a well known common channel signaling protocol (CCSP) and any well known predictive dialing techniques. A CCSP uses a common data channel to provide signaling needed to set up voice connections (i.e., calls) over multiple voice or bearer channels. Although the exemplary embodiment described herein uses an integrated services digital network (ISDN) protocol, the present invention can also be implemented with asynchronous transfer mode (ATM) or other types of CCSPs.

Since the bearer channels are not required in signaling and establishing the call, the system 10 of the present invention can place outbound telephone calls without allocating bearer channels in advance. Part of establishing a call using a CCSP is negotiating how many bearer channels should be connected. ISDN, for example, was designed to allow video conferencing. Thus, when a connection is made using ISDN, the bandwidth is negotiated to determine if additional bearer channels are necessary to handle a transmission requiring more bandwidth, such as a video transmission. For a typical voice call, however, only one bearer channel is required, and it is also possible to leave a short data message using CCSP, without using any bearer channel. Thus, a call can be made without allocating a bearer channel and the bearer channel can be allocated during the negotiation process if a connection is made. If the called number is busy or does not answer, the bearer channels are not allocated and are not used unnecessarily.

The telephony system 10 includes a dialing switch 20 that is used to automatically dial the telephone numbers of the called parties 14, to detect the call progress (busy, answered, no answer, answer machine, and the like), and to connect an available calling party 12 to the called party 14 if an answer is detected. One example of the dialing switch 20 is the digital communications server (DCS) available from Davox Corporation of Westford, Mass., standard PBX telephone switches, or Centrex type switches. The present invention can also use other dialing switches capable of automatically dialing using ISDN or another CCSP. The telephony system 10 also includes audio communications devices 16, such as telephones or head sets, coupled to the dialing switch 20 and used by the calling parties 12 to communicate with the called parties 14.

The dialing switch 20 is connected to a central office switch 22 that provides ISDN services. In the exemplary embodiment, the dialing switch 20 is connected to the central office switch 22 through a primary rate interface (PRI) connection 24, for example, over a T1 line. The PRI connection 24 provides twenty-three bearer channels (or B channels) 26 and one data channel (or D channel) 28 from the dialing switch 20 to the central office switch 22. The bearer channels 26 carry the voice signals between the calling parties 12 (e.g., the agents) and the called parties 14. The number of calling parties 12 connected to the dialing switch 20 preferably equals the number of bearer channels 26 supported by the dialing switch 20. In a small call center where predictability of call pacing is less accurate, there may be at least one extra line to handle hold messages. The data channel 28 carries the dialing commands and other signaling needed to establish the voice connections on the bearer channels 26.

The telephony system 10 also includes a telephony system control/manager 30 used to control the dialing and/or to manage the resources of the telephony system 10. One embodiment of the telephony system 10 is a telephone call center in which the calling parties 12 are agents and the called parties 14 include customers or potential customers. In a telephone call center, agent workstations 18 are coupled to the telephony system control/manager 30 and are associated with each of the agents or calling parties 12.

One example of the telephony system control/manager 30 used in this embodiment includes one or more computers running software for controlling and managing a call center, such as the UNISON® call center software available from Davox Corporation. The present invention can also be used in other types of telephony systems using other types of hardware/software to control and manage the outbound dialing in the present invention.

The telephony system control/manager 30 can be coupled to one or more hosts 32 that contains data or call records corresponding to the called parties 14 including at least the telephone number and name of the called party. The call records stored on the host(s) 32 can also include other pertinent information, such as account information. The telephony system control/manager 30 retrieves the appropriate call records from the host(s) 32 and sends the telephone numbers to the dialing switch 20. The dialing switch 20 dials the appropriate telephone numbers, for example only using predictive dialing, as will be described in greater detail below. If an answer is detected, the control/manager 30 assigns the answered call to an available agent. If no agents are available, the control/manager 30 can abort the call or place the answered call in a hold queue to await an available agent. Ideally, the outbound dialing is paced to avoid having to place any calls on hold. The control/manager 30 can also monitor the hold queue and the available agents and also maintains outbound call statistics pertaining to the calls placed by the dialing switch 20 and the connections that are made.

According to the method of the present invention, a predictive dialing algorithm controls the signaling over the D channel 28 such that the number of calls placed using the D channel 28 exceeds the number of bearer channels 26. This is accomplished using common channel dialing with no allocated bearer channels as described above. Since the number of telephone numbers transmitted over the data channel 28 exceeds the number of available bearer channels 26, the dialing switch 20 is using virtual numbers to attempt connections. Once connections are made, the available bearer channels are allocated during the negotiation process, which is part of the existing CCSP protocol. As a result, the use of bearer channels 26 is maximized because the dialed numbers that result in no answers or busy signals do not tie up an allocated bearer channel. This technique of predictive dialing using a CCSP without allocating bearer channels in advance can be implemented in any type of ISDN protocol or other CCSP One method of dialing, according to the present invention, determines predictive dialing factors, step 102, such as an anticipated connect ratio (ACR) of dialed numbers to connections with called parties, an average talk time (ATT), the size of the agent pool handling the calls, the number of idle agents in between calls, the number of calls on ho and the call hold time. The predictive dialing factors can be obtained from the statistics maintained by the telephony system control/manager 30 and/or maintained by the dialing switch 20. These predictive dialing factors are then used by the predictive dialing algorithm to determine the number of calls to be placed simultaneously as well as the rate of placing the calls. The system 10 can also dynamically update the predictive dialing factors (and the rate of placing calls) as the statistics changes. The determination of predictive dialing factors and the predictive dialing algorithm can be implemented using software and hardware, for example, in the telephony system control/manager 30 and/or the dialing switch 20.

Based upon the predictive dialing algorithm, the system 10 determines the number of telephone numbers to be dialed and/or the rate of dialing, step 104. In one simplified example, the system 10 determines a fixed ACR, for example, by averaging the ratio of dialed numbers to actual connections. The number of telephone numbers to be dialed will exceed the number of bearer channels by a factor equivalent to the ACR. For example, if the call statistics show that one connection has been made for every two calls that have been placed, the ACR can be set at two, i.e., the number of calls placed will be twice the number of bearer channels. If the size of the agent pool includes twenty (20) agents (using twenty (20) bearer channels 26), 40 telephone numbers are sent to the dialing switch 20 over the D channel 28. The calls are then paced based upon the average talk time (ATT) The dialing speed or rate can be controlled (throttled) based upon the number and duration of calls on hold (e.g. dialing can be ceased if there is more than 1 call on hold) or accelerated if an excess number of agents are idle.

Although a relatively simple predictive dialing/call pacing algorithm is described herein, various other predictive dialing factors can also be considered and any type of predictive dialing/call pacing algorithm can be used. One example is the call pacing algorithm disclosed in greater detail in U.S. Pat. No. 5,295,184 entitled DYNAMICALLY ADJUSTABLE CALL PACING SYSTEM, assigned to the assignee of the present invention and incorporated herein by reference.

As determined by the predictive dialing algorithm, the dialing switch 20 transmits dialing commands or signals over the data channel 28 to effect dialing of the appropriate number of telephone numbers, step 106. When the dialing commands have been transmitted over the data channel 28, the dialing switch 20 detects the answered calls, step 108, for example, by receiving HDLC commands sent down the D channel indicating events, such as busy or answered. If calling parties or agents are available to take an answered call, step 110, the dialing switch 20 connects the answered calls over the bearer channels 26 to available agents or calling parties 12, step 112. If no agents are available, the answered call is either aborted or placed in a hold queue, step 114.

Figure 2:
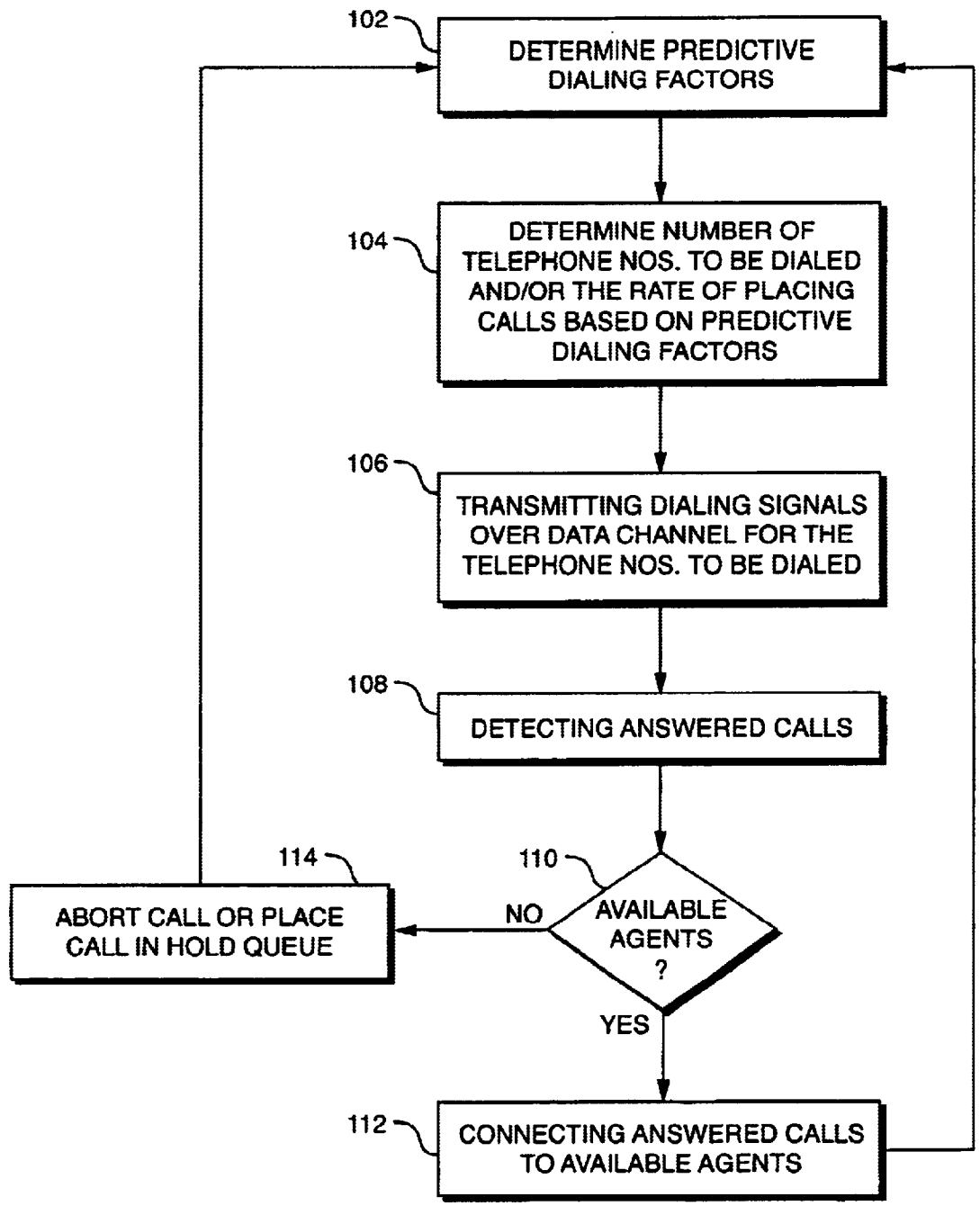
FIG. 2 is a flow chart illustrating the method for dialing in a telephony system using a common channel signaling protocol, according to the present invention.

The process preferably repeats continuously during an outbound call campaign, dynamically updating the predictive dialing factors and adjusting the call pacing accordingly to ensure that the use of bearer channels is maximized and the number and duration of calls on hold is minimized. When agents are not available to handle answered calls, for example, the call pacing or rate of placing calls is reduced, step 104. Although the method of the present invention is shown in FIG. 2 as a flow chart, it should be understood that each step of the process can run simultaneously.

In addition to the call pacing described above, the present invention enables burst dialing where a large number of calls are attempted initially to occupy an idle connection 24. In one example, 46 attempted calls can be placed simultaneously to rapidly occupy an idle PRI line 24 having 23 bearer channels. This type of burst dialing is not possible in DTMF/ROBBED bit channel dialing without using at least two T1 spans.

Accordingly, the system and method of the present invention maximizes ISDN resources by pacing calls in a manner that will keep all bearer channels in use. Thus, the number of ISDN lines required to support a call center using predictive dialing will be reduced.

Modifications and substitutions by one of ordinary skill in the art are considered to be within the scope of the present invention which is not to be limited except by the claims which follow.

What is claimed is:

1. A method of dialing in a telephony system using a common channel signaling protocol having at least one data channel for carrying call data signals and a number of bearer channels for carrying voice signals, said method comprising the acts of:

determining predictive dialing factors;

using a predictive dialing algorithm to determine a number of telephone numbers to be dialed based upon said predictive dialing factors; and transmitting dialing commands over said data channel for said number of telephone numbers to be dialed, wherein said dialing commands are transmitted over said data channel without allocating any of said bearer channels.

2. The method of claim 1 further including the acts of:

detecting at least one answered call; and allocating an available bearer channel to said at least one answered call.

3. The method of claim 1 wherein said common channel signaling protocol is an Integrated Services Digital Network (ISDN) protocol.

4. The method of claim 3 wherein said ISDN protocol includes a primary rate interface connection having one data channel and twenty-three bearer channels.

5. The method of claim 1 wherein said common channel signaling protocol is an Asynchronous Transfer Mode (ATM) protocol.

6. The method of claim 1 wherein the acts of determining said number of telephone numbers to be dialed and transmitting said dialing commands are performed continuously in a call pacing mode.

7. The method of claim 6 wherein the act of determining said predictive dialing factors is performed continuously to dynamically update said predictive dialing factors.

8. The method of claim 1 wherein the acts determining said number of telephone numbers to be dialed and transmitting said dialing commands are performed at least once in a burst dialing mode.

9. The method of claim 1 further including the act of tracking call statistics pertaining to the number of connections made based upon the number of calls placed, wherein said predictive dialing factors are determined from said statistics.

10. The method of claim 9 wherein the step of determining said predictive dialing factors is performed continuously to dynamically update said predictive dialing factors determined from said statistics.

11. The method of claim 1 wherein said telephony system is a call center including a plurality of agents for handling telephone calls, wherein said number of bearer channels equals the number of said plurality of agents.

12. The method of claim 11 wherein said predictive dialing factors include an anticipated connect ratio of dialed numbers to connections with said agents and an agent pool size.

13. The method of claim 12 wherein said predictive dialing factors further include an average talk time and a number of idle agents.

14. A method of dialing in a call center using a common channel signaling protocol having at least one data channel for carrying call data signals and a number of bearer channels for carrying voice signals, said method comprising the acts of:
    transmitting dialing commands over said data channel for dialing a plurality of telephone numbers, wherein said dialing commands are transmitted over said data channel without allocating any of said bearer channels;
    detecting at least one answered call; and
    allocating an available bearer channel to said at least one answered call.

15. The method of claim 14 further comprising the act of pacing said dialing based upon available agents in said call center.

16. A predictive dialing system using a common channel signaling protocol having at least one data channel for carrying data signals and a number of bearer channels for carrying voice signals, said predictive dialing system comprising:
    means for determining predictive dialing factors;
    means for determining a number of telephone numbers to be dialed using a predictive dialing algorithm and said predictive dialing factors, wherein said number of telephone numbers to be dialed exceeds said number of bearer channels; and
    means for transmitting dialing commands for said number of telephone numbers to be dialed over said data channel to a central office switch, and for switching answered calls to available bearer channels.

17. The system of claim 16 wherein said common channel signaling protocol is an Integrated Services Digital Network (ISDN) protocol.

18. The system of claim 17 wherein said ISDN protocol includes a primary rate interface connection having one data channel and twenty-three bearer channels.

19. The system of claim 16 wherein said common channel signaling protocol is an Asynchronous Transfer Mode (ATM) protocol.

20. The system of claim 16 wherein said predictive dialing system is implemented in a call center having a number of agents equaling said number of bearer channels, and wherein said predictive dialing factors include an anticipated connect ratio of dialed numbers to connections with said agents and an agent pool size.

21. A telephony system for predictive dialing using a common channel signaling protocol having at least one data channel for carrying data signals and a number of bearer channels for carrying voice signals, said telephony system comprising:
    a telephony system control/manager, for determining predictive dialing factors, and for determining a number of telephone numbers to be dialed according to said predictive dialing factors, wherein said number of telephone numbers to be dialed exceeds said number of bearer channels;
    a dialing switch, connected to said telephony system control/manager and to said data channel and said bearer channels, for transmitting dialing commands for said number of telephone numbers to be dialed over said data channel to a central office switch, and for switching answered calls to available bearer channels; and
    a plurality of audio communications devices, coupled to said dialing switch, for connecting to said answered calls over said bearer channels, wherein the number of said audio communications devices equal said number of bearer channels.

22. The telephony system of claim 21 wherein said common channel signaling protocol is an Integrated Services Digital Network (ISDN) protocol.

23. The telephony system of claim 22 wherein said ISDN protocol includes a primary rate interface connection having one data channel and twenty-three bearer channels.

24. The telephony system of claim 21 further including a host storing a plurality of call records pertaining to called parties, wherein said telephone numbers are obtained from said host.

25. The telephony system of claim 21 wherein said telephony system control/manager tracks call statistics pertaining to the number of connections made based upon the number of calls placed and determines said predictive dialing factors from said statistics.

26. The telephony system of claim 21 further including wherein said predictive dialing factors include an anticipated connect ratio of dialed numbers to connections with said audio communications devices.

27. A predictive dialing system using a common channel signaling protocol having at least one data channel for carrying data signals and a number of bearer channels for carrying voice signals, said predictive dialing system comprising:
    means for determining a number of telephone numbers to be dialed using a predictive dialing algorithm and a predictive dialing factors, wherein a number of telephone numbers to be dialed exceeds said number of bearer channels; and
    means for transmitting dialing commands without allocating bearer channels for said number of telephone numbers to be dialed over said data channel to a central office switch, and for switching answered calls to available bearer channels.

* * * * *